United States Patent [19]

Cheney et al.

[11] Patent Number: 5,140,540

[45] Date of Patent: Aug. 18, 1992

[54] DELAY EQUALIZATION EMULATION FOR HIGH SPEED PHASE MODULATED DIRECT DIGITAL SYNTHESIS

[75] Inventors: Bruce W. Cheney, Sherwood; Donald C. Larson, Beaverton; Arnold M. Frisch, Portland, all of Oreg.

[73] Assignee: TriQuint Semiconductor, Inc., Beaverton, Oreg.

[21] Appl. No.: 559,795

[22] Filed: Jul. 30, 1990

[51] Int. Cl.$^5$ ............................................... G06F 1/02
[52] U.S. Cl. ................................................ 364/718
[58] Field of Search ............................ 364/718-721, 364/724.20

[56] References Cited

U.S. PATENT DOCUMENTS 4,958,310  9/1990  Goldberg ............................ 364/718

Primary Examiner—Long T. Nguyen
Attorney, Agent, or Firm—Skjerven, Morrill, MacPherson, Franklin & Friel

[57] ABSTRACT

In a pipelined direct digital synthesis system (FIG. 3), new increment data (124) and/or phase modulation data (122) are input delay equalized by providing the data to a series of switch blocks (132), each switch block corresponding to a stage of the accumulator (124). Each switch block includes a multiplexer (132) for selecting among the new increment data, phase modulation data, and previously stored increment data, and includes a flip-flop circuit (134) for storing the selected increment data. A shift register (140) provides select signals (146) to each of the multiplexers. In operation, as a single bit propagates through the shift register, the select signals sequentially control the multiplexers to sequentially interleave blocks of selected increment data into respective accumulator stages in ascending order of binary significance. The invention thereby substantially reduces the input delay equalization circuitry necessary for coherent operation.

14 Claims, 19 Drawing Sheets

OUTPUT DELAY
EQUILIZATION
(TRADITIONAL)

OUTPUT DELAY
EQUILIZATION
(TRADITIONAL)

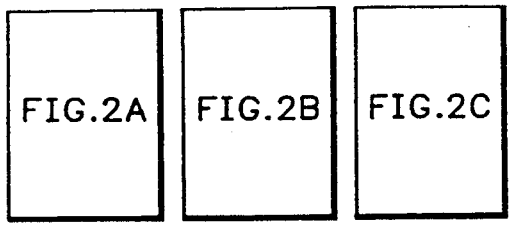
FIG. 2D
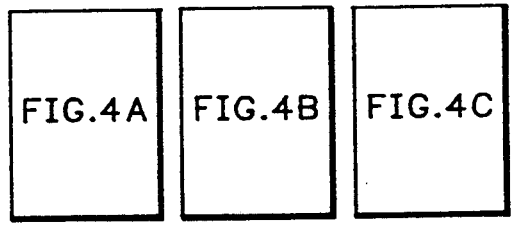
FIG. 4D
MUX TRUTH TABLE
| MODE | SELECT | OUTPUT |
|------|--------|--------|
| 0 | 0 | Q PREVIOUS |
| 0 | 1 | NEW C |
| 1 | 0 | NEW C |
| 1 | 1 | NEW D |
FIG. 5b
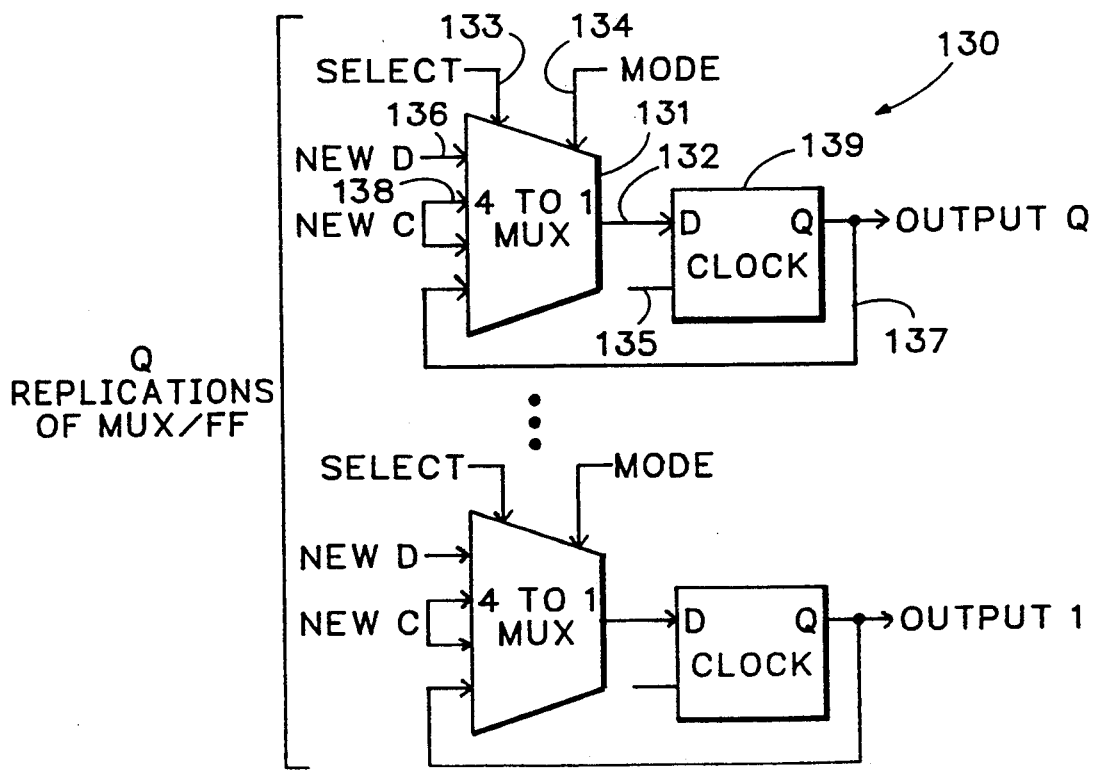
FIG. 5a

DELAY EQUALIZATION EMULATION FOR HIGH SPEED PHASE MODULATED DIRECT DIGITAL SYNTHESIS

BACKGROUND OF THE INVENTION

This invention relates to input delay equalization in pipelined accumulator systems and, more particularly, to input delay equalization emulation in high speed, phase modulated direct digital synthesis (DDS) systems.

At the core of pipelined DDS systems is an accumulator block using replications of a register element that stores the sum bits and the carry bit in flip-flops. Because of the pipelined architecture, the output sum bits from each stage must be delayed through as many register elements as there are pipelined stages between the most significant stage and the particular stage of concern. After this "delay equalization", the sum can be used to address a ROM, RAM or other suitable memory block that stores digitized values of a sine, cosine, or other waveform. Data retrieved from the memory block may be used in various ways, for example to drive D/A circuitry to form an analog output waveform.

To achieve phase modulation of an output waveform, an increment value of the accumulator must be changed regularly. Traditionally, a loadable down counter and multiplexer arrangement have been used to regularly change the accumulator increment. For example, one 2:1 multiplexer ("mux") is provided for each bit of the accumulator. One input of each multiplexer receives a corresponding bit of a NEW C word (C for Complete phase increment or accumulation value), while the other input of each multiplexer receives a corresponding bit of a NEW D word (D for Delta phase increment or phase modulated value). In phase modulated mode, each time the counter completes a predetermined "repeat value" number of counts, corresponding to an offset, all of the multiplexers are switched from sourcing NEW C bits to sourcing NEW D bits for one clock cycle, and then switched back to sourcing NEW C.

Because the accumulator is pipelined, changes to the increment value, i.e. the 2:1 multiplexer output data, must be "delay equalized" in a manner similar to the outputs, i.e., using registers. All bits of the input increment value must be delay equalized, even though the only output bits that have to be delay equalized are those that form the ROM/RAM address. The necessary increment value delay equalization circuitry thus is very large. The number of flip-flops needed in this architecture is given by the formula:

$$(Q * (N^2 + N))/2$$

where Q is the number of bits per pipelined stage, and N is the number of pipelined stages. Thus, for example, a 24 bit accumulator with 2-bit pipelined segments requires 156 flip-flops for input delay equalization alone. These numbers of flip-flop circuits demand substantial circuit area and power.

What is needed is a way to reduce the number of flip-flops required in the input delay equalization area.

SUMMARY OF THE INVENTION

The present invention includes a radical departure from traditional equalization techniques, which results in a reduced flip-flop count equal to $(Q * N) + N$ and simultaneously provides a superior method for regularly changing the increment value (phase modulation) at high speeds. For the 24 bit accumulator example discussed above (having 2-bit pipelined stages), the number of flip-flops required is reduced from 156 to 36, a 77% improvement. Reducing the number of flip-flops reduces component count and therefore device area and power consumption, and alleviates clock distribution difficulties. Significant performance improvements are made possible, and the available chip area in an integrated circuit embodiment of the invention can be utilized, for example, to increase ROM size. The equalization methods and circuits disclosed are applicable to virtually any pipelined accumulator application.

According to one aspect of the invention, accumulator input delay circuitry includes a series of switch blocks, each switch block corresponding to a respective stage of the accumulator, for providing selected increment data to the corresponding stage. For example, to provide increment data to an N stage accumulator, each stage having Q bits, would require N switch blocks, each switch block having Q bit positions.

Each switch block includes a multiplexer and a flip flop for each bit position. The multiplexer output is connected to the flip-flop data input, for storing data selected by the multiplexer. The flip-flop output terminal is coupled to the corresponding accumulator input bit position to provide increment data, as more fully described below.

A binary word representing new increment data, called NEW C, is partitioned to form a first ordered series of N groups of bits, each group having Q bits, so each group corresponds to a respective stage of the accumulator. A binary word representing a phase modulation increment, called NEW D, is similarly partitioned, although NEW D may have only M groups of Q bits, where M is a nonzero integer less than or equal to N. In other words, the phase modulation increment need not have the full resolution of the accumulator.

The NEW C and NEW D bits are coupled to respective inputs to the multiplexers in corresponding bit positions. Additionally, the flip-flop output terminals are coupled to respective inputs to the corresponding multiplexers. Accordingly, each multiplexer can select one of a NEW C bit, a NEW D bit, or a Q previous bit.

The multiplexer can be placed in one of two modes, responsive to a binary Mode signal. In a first mode (mode signal deactivated), the choice of output is NEW C or Q Previous. This mode is used for non-phase modulated operation. In the other mode (mode signal activated), the choice of output is NEW D or NEW C. This mode is used for phase modulation.

A serial shift register has each of its output terminals coupled to a respective one of the switch blocks to provide a binary select signal, to control the multiplexers within each switch block as a group, whereas all of the multiplexers are controlled by a common Mode signal. Non-phase modulated operation in the new architecture includes sourcing an accumulator increment (NEW C), deactivating the Mode signal, and sending a pulse propagating synchronously down the shift register, successively sourcing the NEW C value in each switch block when the pulse is present and the current value when the pulse is absent. The accumulator will then successively add the increment onto itself. This mode can be used to initialize operations to either a "0" NEW C value or some other NEW C constant.

Phase modulated operation includes sourcing an accumulator increment (NEW C), a phase modulation increment (NEW D), and a predetermined Repeat Value. The Mode signal is activated, and when the counter reaches its Terminal Count, a pulse is sent down the shift register. The pulse successively causes each shift register output to change state, thereby switching the multiplexers in each switch block to source bits of NEW D, and then switch back to the NEW C value after the pulse passes. In this manner, each bit of the phase increment word is delayed by the correct number of clock cycles before it is input to the accumulator, without requiring an array of flip-flops.

The foregoing and other objects, features and advantages of the invention will become more readily apparent from the following detailed description of a preferred embodiment which proceeds with reference to the drawings.

BRIEF DESCRIPTION OF THE DRAWINGS

FIG. 2 comprises FIGS. 2A, 2B and 2C arranged as indicated by FIG. 2D.

FIG. 4 comprises FIGS. 4A, 4B and 4C arranged as indicated by FIG. 4D.

FIG. 5A is a schematic diagram showing detail of one switch block of the diagram of FIG. 4.

FIG. 5B is a truth table for the multiplexers of FIG. 5A.

FIG. 6 comprises FIGS. 6A, 6B, 6C and 6D.

FIG. 7 comprises FIGS. 7A and 7B.

FIG. 8 comprises FIGS. 8A and 8B.

DETAILED DESCRIPTION OF THE PREFERRED EMBODIMENT

Figure 1:
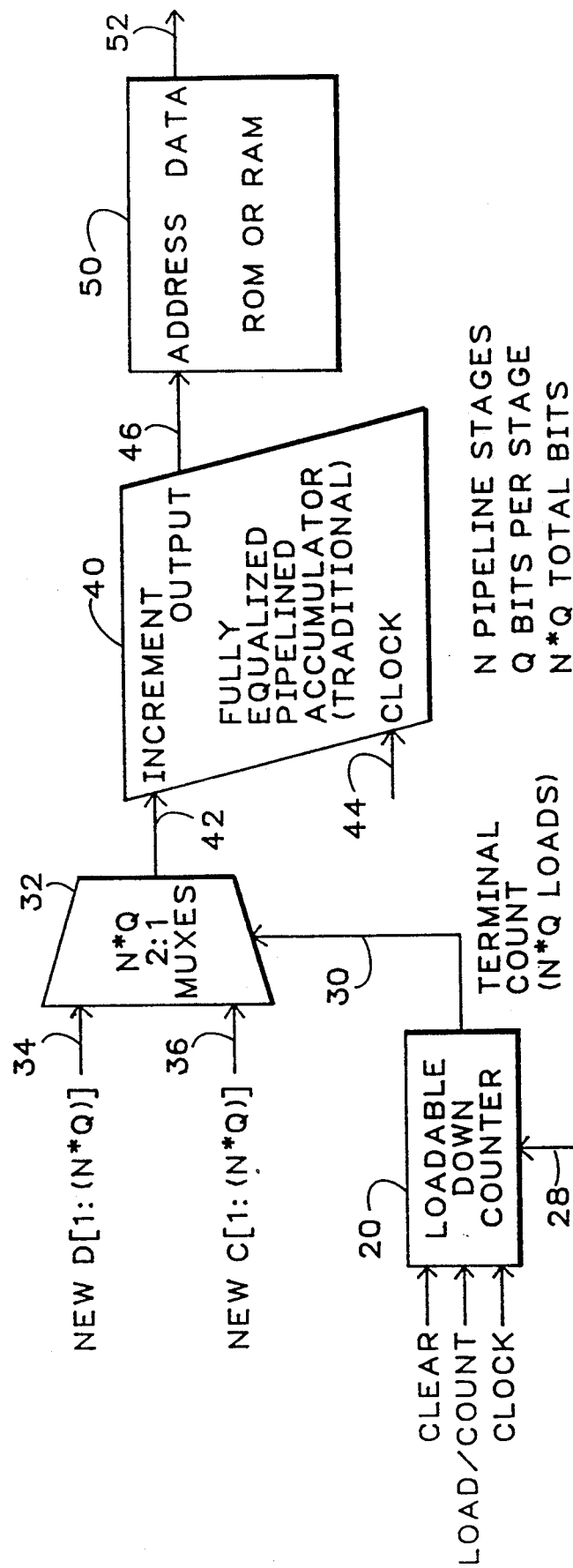
FIG. 1 is a functional block diagram of a traditional fully equalized pipelined DDS system.
Figure 2A:
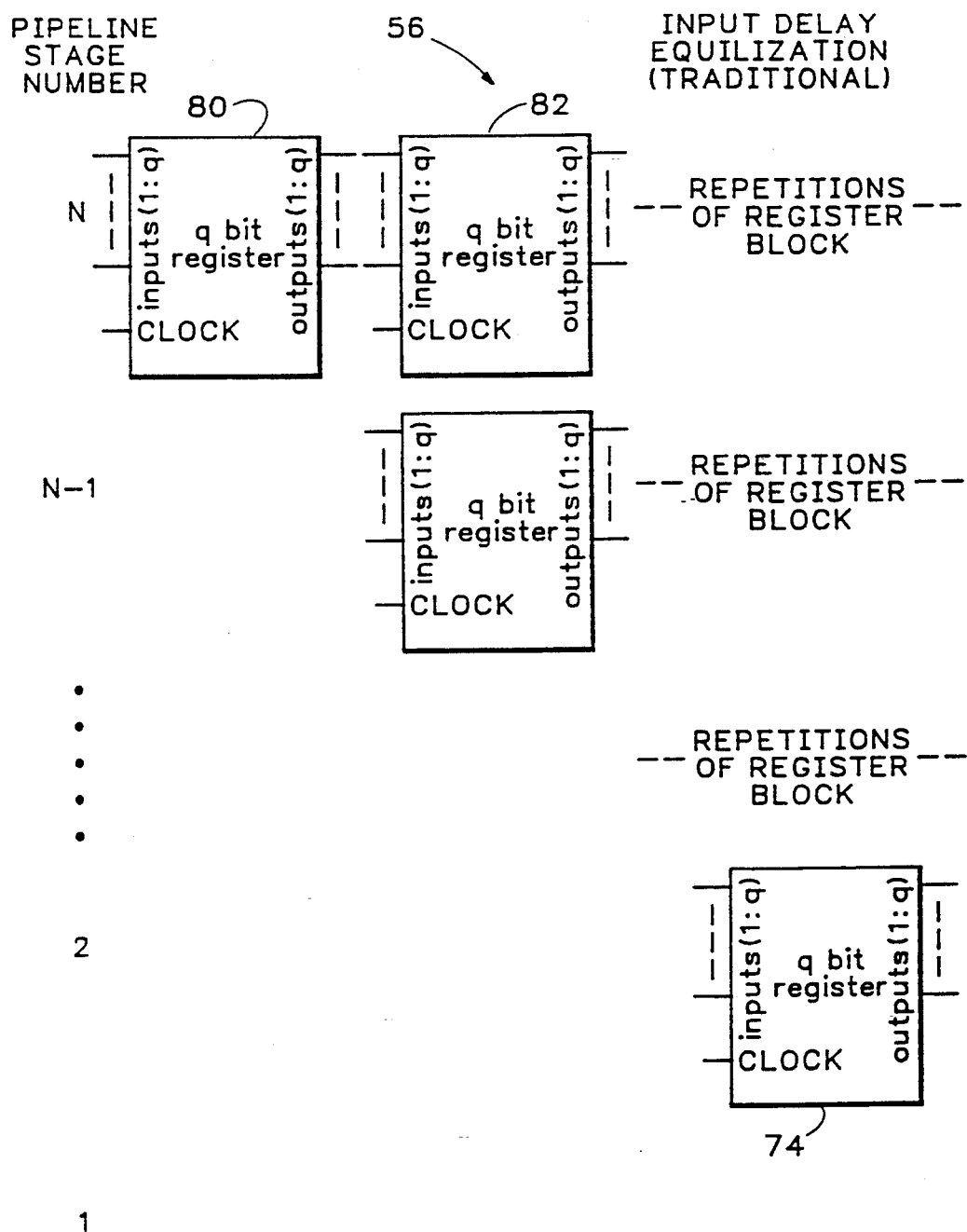
FIG. 2 is a schematic diagram showing details of the input delay equalization, pipelined accumulator and, output equalization sections of the system of FIG. 1.
Figure 2B:
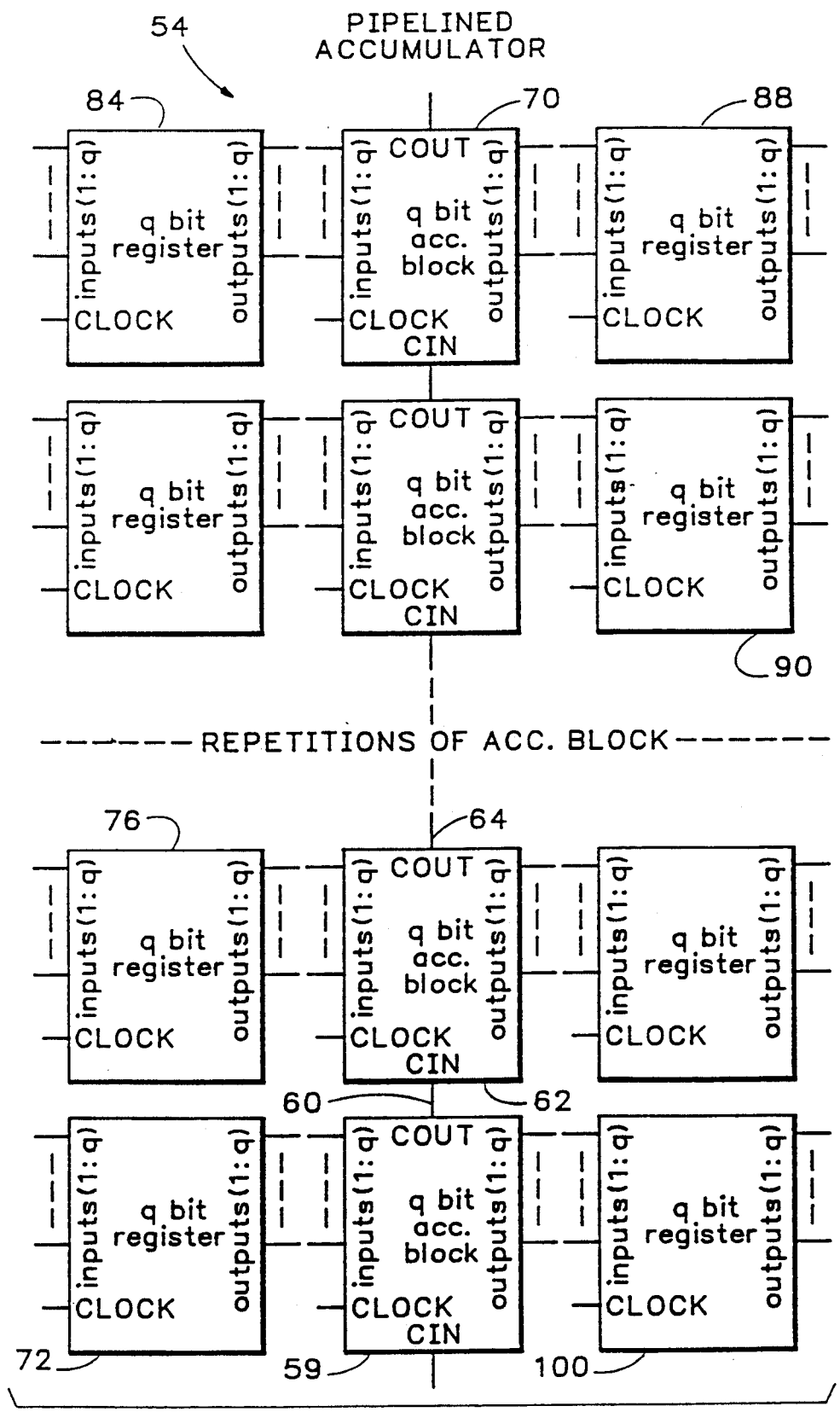
Figure 2C:
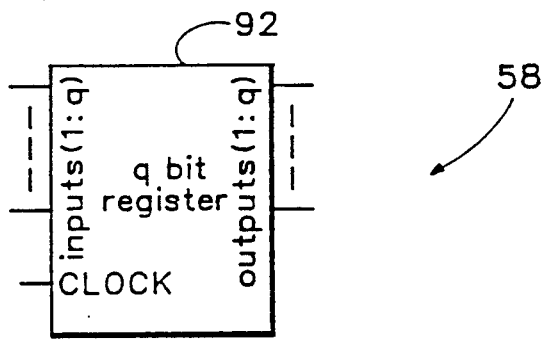
Figure 2C:
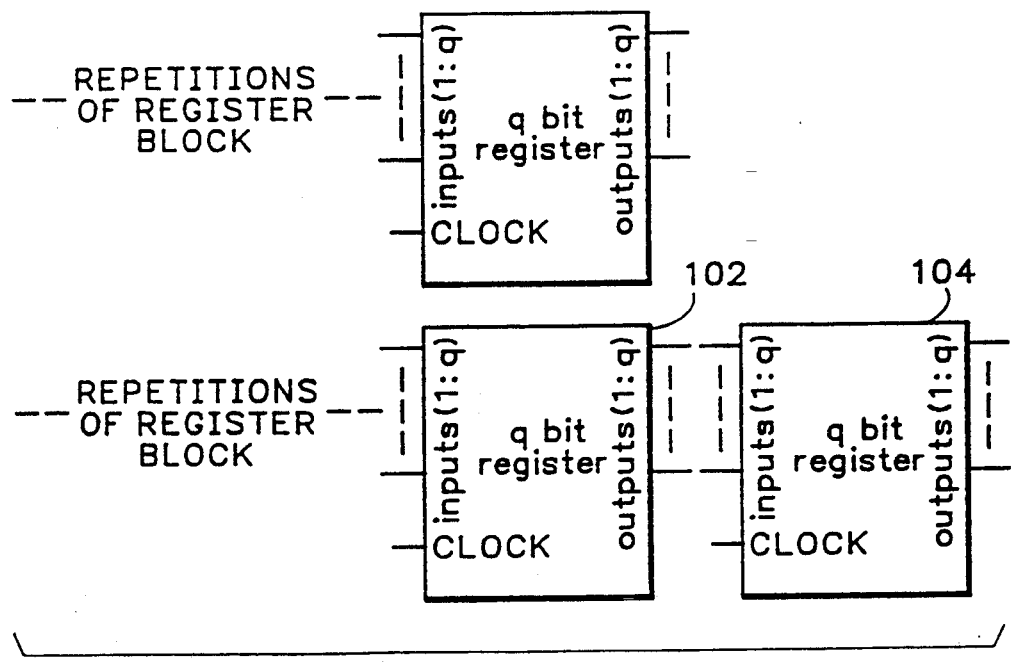

FIG. 1 is a functional block diagram of a traditional pipelined DDS system. The DDS system employs a fully equalized pipelined accumulator 40, having N stages and Q bits per stage, for a total of N*Q accumulator bits. A multiplexer array 32 includes N*Q 2:1 multiplexers for selecting one of two input data words. The selected input data word is provided to the accumulator 40 over a path 42 as an increment value. An accumulator clock signal is provided to the accumulator at 44. The accumulator provides output data along a path 46 to address a ROM or RAM 50. The ROM or RAM, in turn, provides data at output 52 which may be used, for example, to drive D/A converter circuitry for synthesizing a waveform previously stored in the ROM or RAM.

A first input data word, NEW D, is provided over a path 34 as one data input to the multiplexer array 32. NEW D consists of N*Q bits and represents a new phase modulation increment value. A second input data word, NEW C, is provided over a path 36 as the other data input to the multiplexer array. NEW C also consists of N*Q bits, and represents a new increment value. A conventional loadable down counter 20 is provided for counting accumulator clock cycles. A predetermined Repeat Value is loaded into the counter 20 via input 28. The control inputs to all of the N*Q multiplexers in array 32 are coupled to receive a Terminal Count signal from the counter 20 along path 30.

In normal mode, the multiplexer array 32 selects the NEW C input word. The accumulator increments by the NEW C value in response to each clock cycle. In a phase modulated mode, every time the down counter 20 reaches a terminal count, the Terminal Count signal is asserted to switch the multiplexers to select sourcing NEW D for one clock cycle, and then switched back to sourcing NEW C. The accumulator output data thus "jumps" by the value of NEW D. This jump in the ROM or RAM address effects phase modulation of the synthesized waveform Referring to FIG. 2, the accumulator 40 includes a pipelined accumulator section 54, input delay equalization section 56, and output delay equalization section 58. Each of these sections will be described in turn.

The accumulator section 54 consists of a series of accumulator blocks, for example accumulator block 70, arranged in a vertical column in the figure. Each accumulator block corresponds to a respective stage of the accumulator. For example, a first accumulator block 59 corresponds to accumulator stage number 1. A second accumulator block 62 corresponds to stage number 2, and so on, so that accumulator block 70 corresponds to accumulator stage N. A carry output terminal of each accumulator block is coupled to a carry input to the next more significant block, for example, along path 60. Because the accumulator is pipelined, the input data or increment word provided to the increment input terminal 42 (FIG. 1) must be equalized with respect to the pipelined accumulator. This is accomplished in the prior art by the input delay equalization section 56, described next.

The input delay equalization section 56 consists of a triangular array of registers, for example register 80, each register having Q flip-flop circuits, where Q is the number of bits per accumulator stage. One register 72 is provided to delay the increment data to accumulator stage I by one clock cycle. Two registers 74,76 are provided to delay the increment data to stage 2 by two clock cycles, and so on. N registers, represented by registers 80, 82, and 84, are provided to delay the increment data to stage N by N clock cycles.

The foregoing circuitry adds bits of the increment word into corresponding stages of the pipelined accumulator at appropriate times according to their binary significance. This alignment would be unnecessary if the increment value were always a constant. However, it is necessary to change the increment value in order to change the frequency of the resulting waveform. To maintain valid accumulator data during the transition, the new increment value is moved into the pipeline through the delay circuitry described.

Finally, FIG. 2 includes an output delay equalization section 58. The output delay circuitry is essentially identical to the input delay equalization circuitry, inverted so that the low order bits receive a maximum delay while the most significant bits receive the minimum delay. Output bits from pipelined stage N, i.e. from accumulator block 70, are provided to the inputs of a register 88 for one clock cycle delay. Similarly, output bits of pipelined stage N-I are provided to a first register 90 and a second register 92, to provide a two clock cycle delay, and so on. The first stage output bits thus are propagated through a series of N registers, represented by registers 100, 102 and 104 to provide a delay equal to N clock periods. The outputs of all of the output equalization registers thus can be concatenated to form a coherent sum. The sum can be used to address a ROM or RAM block that stores digitized values of a predetermined waveform.

Only the output bits that form the ROM or RAM address must be delay equalized. All bits of the input increment value must be delay equalized. The large number of flip-flops needed can be dramatically reduced by utilizing a different approach to the delay problem, described next.

Figure 3:
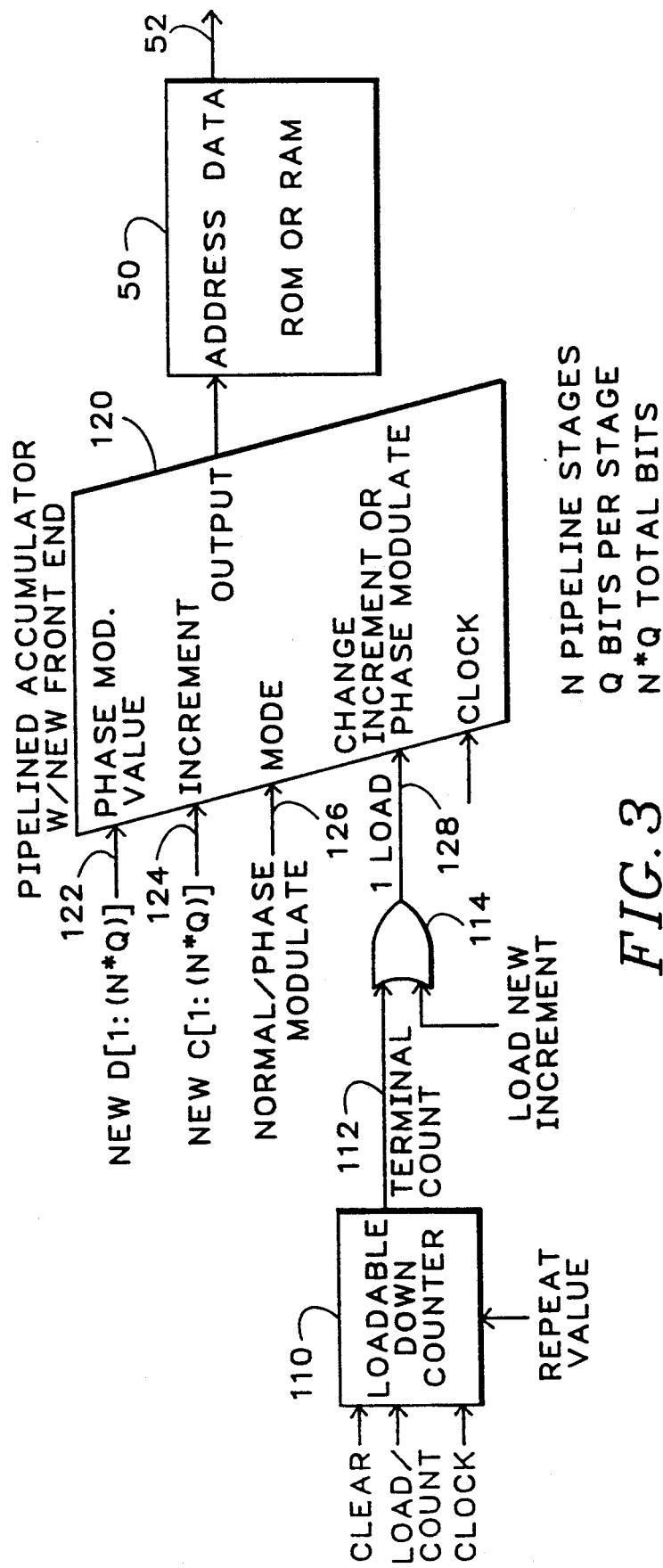
FIG. 3 is functional block diagram of a new fully equalized pipelined DDS system according to the present invention.

FIG. 3 is a block diagram of a new, fully equalized pipelined DDS system according to the present invention. In general, the new system of FIG. 3 provides the same function as the system of FIGS. I and 2 The new system offers several important advantages over the prior art, however, as will become apparent below.

Referring to FIG. 3, the new system includes a loadable down counter 110, similar to the counter 20 described above. The Terminal Count signal from the new counter 110, however, need only drive a single output load (path 112), whereas counter 20 (FIG. 1) drives N*Q loads. The new counter thus has reduced fan-out circuitry. An OR logic gate 114 is connected to receive the Terminal Count signal at one input terminal and a "load new increment" signal, provided by a host system, at the other input terminal. The logic OR signal is coupled over path 128 to new pipelined accumulator circuitry 120 to indicate change increment or phase modulate. The new circuitry 120 provides output data for addressing a ROM or RAM 50, to provide data 52 to synthesize a predetermined waveform.

The new accumulator circuitry 120 includes a first input terminal 122 for receiving a phase modulation value (NEW D); a second input terminal 124 for receiving an increment value (NEW C); and a mode input terminal 126 for receiving a binary Mode signal to switch between a normal mode and a phase modulate mode, as more fully described below.

Figure 4A:
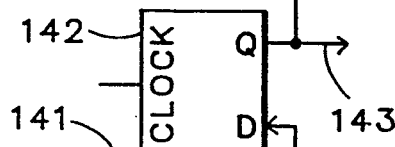
FIG. 4 is a schematic diagram showing details of the input delay equalization, pipelined accumulator and output delay sections of the system of FIG. 3.
Figure 4B:
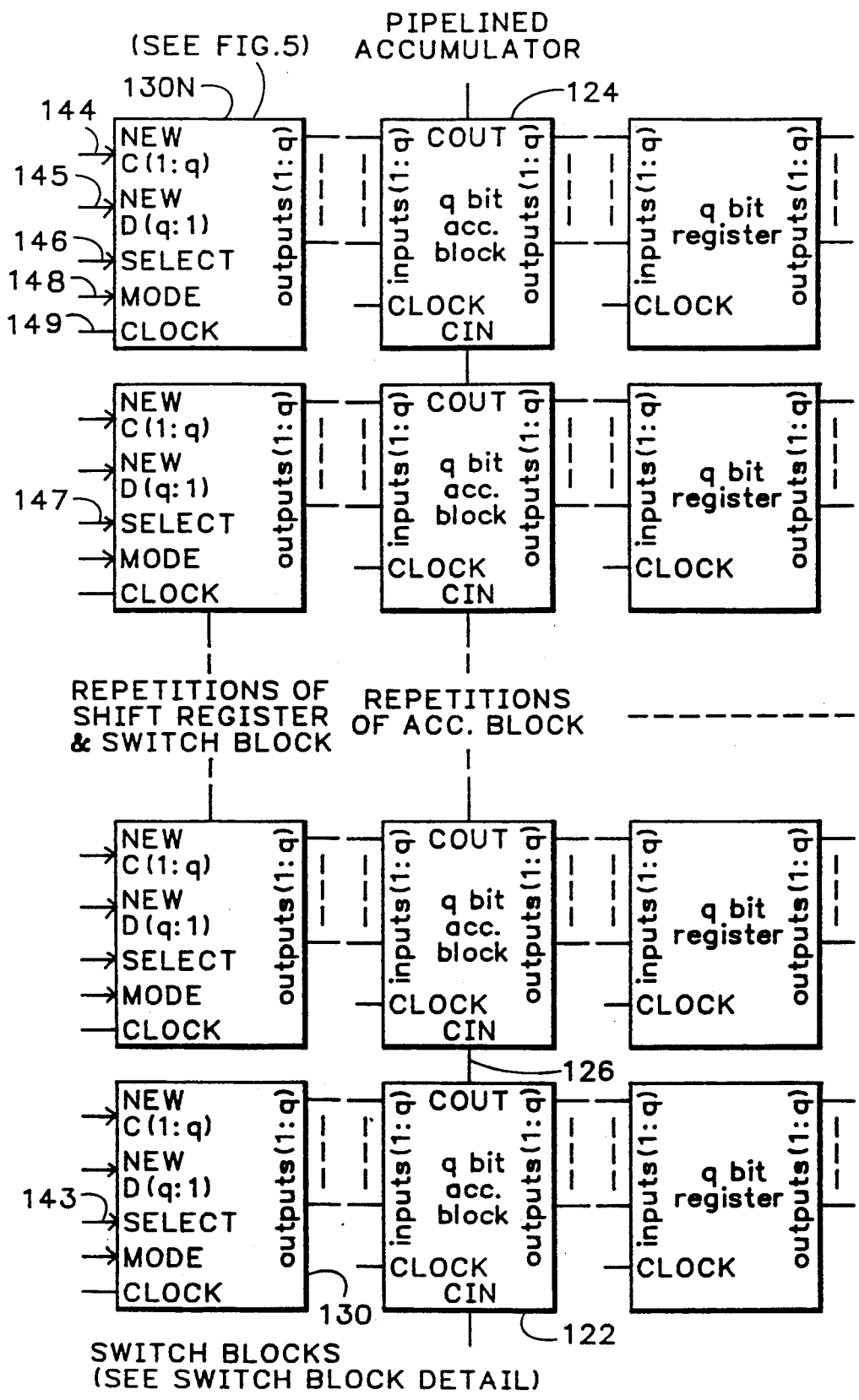
Figure 4C:
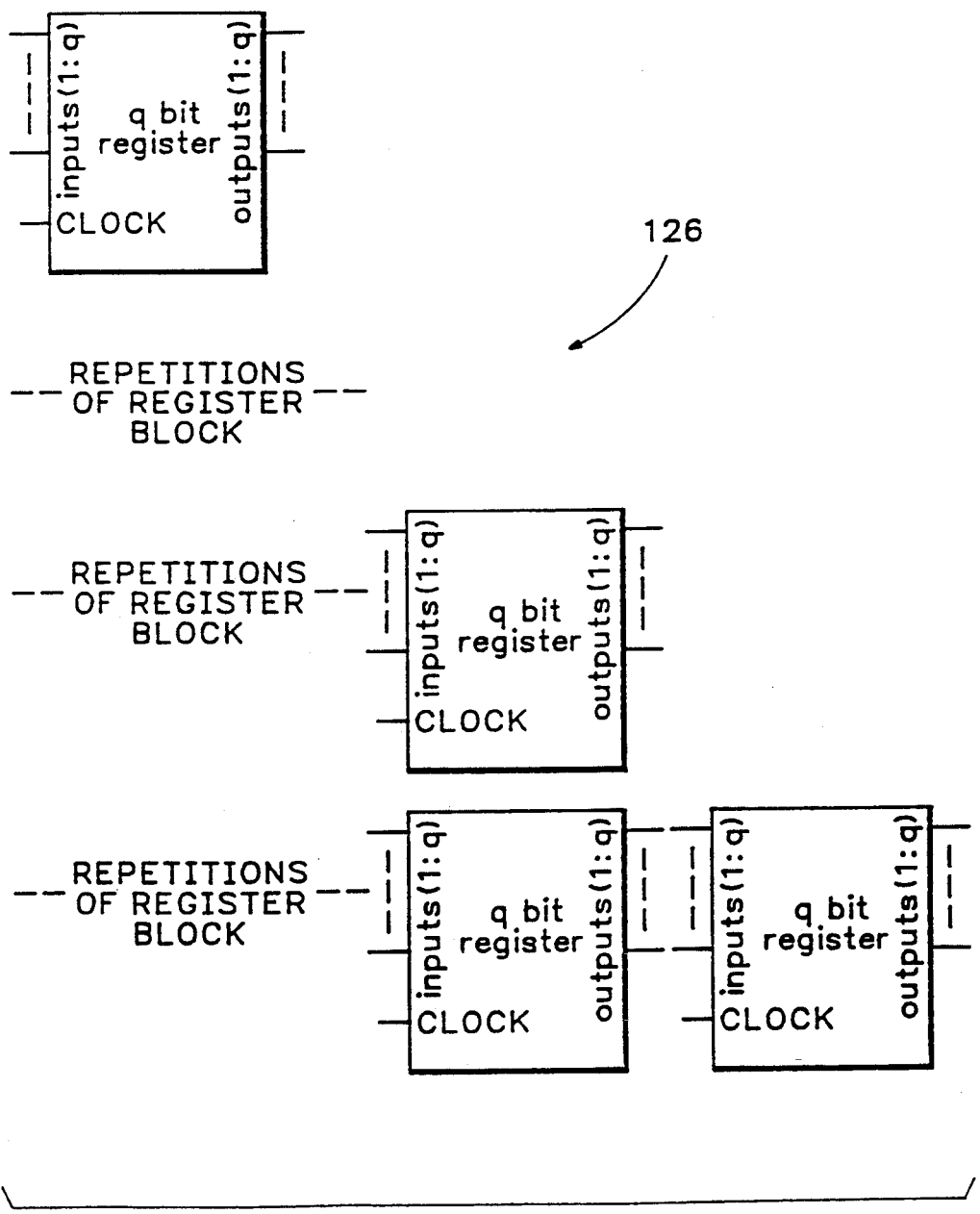

FIG. 4 is a schematic diagram showing in greater detail the new accumulator circuitry 120. The pipelined accumulator is partitioned, as before, into a series of N pipelined stages, each stage having Q bit positions. Each accumulator stage is implemented in a corresponding accumulator block, for example, accumulator block 122 in stage 1 and accumulator block 124 in stage N. The accumulator block circuitry is essentially identical to that shown in FIG. 2. FIG. 4 also includes an output delay equalization section 126, similar to the prior art, so it will not be described further.

Input data is provided to the accumulator blocks by new input delay equalization circuitry, as follows. The new input circuitry includes a series of switch blocks, for example switch block 130 at pipelined stage 1 and switch block 132 at pipelined stage N. Each switch block has Q-bit output port, coupled to a corresponding accumulator input port, to provide increment data to one stage of the accumulator. For example, switch block 130 provides increment data to accumulator block 122 (stage 1) and switch block 130N provides increment data to accumulator block 124 (stage N).

The switch blocks essentially are identical. Each switch block has a first input port, for example input port 144 to block 130N, for receiving corresponding bits of a first binary word (NEW C) representing a predetermined new frequency increment value. Specifically, NEW C is partitioned to form an ordered series of N groups of bits, each group having a number of bits Q equal to the pipelined stage size. Each group of bits is provided to the first input port of a respective one of the switch blocks.

Each switch block also includes a second input port, for example port 145, for receiving bits of a second binary word NEW D, representing a predetermined phase modulation increment value. NEW D similarly is partitioned to form an ordered series of N groups of Q bits per group. Each group of bits is provided to the second input port of a respective one of the switch blocks. NEW D may consist of fewer than N groups of bits, as further discussed below with regard to an example of an operative design, in which case the NEW D bits are provided only to the switch blocks corresponding to the most significant stages of the accumulator.

Each switch block 130, 130N, selects data for input to the corresponding accumulator block, in the normal or non-modulation mode of operation, responsive to the state of a binary select signal, provided to each switch block at a respective select input terminal, for example input terminals 143, 146, and 147. For steady-state operation, i.e. at a constant synthesized waveform frequency and without phase modulation, the switch blocks 130 through 130N together provide a constant increment value to the accumulator.

An N-bit serial shift register 140 is formed of a series of N flip-flop circuits, for example flip-flop 142 at stage 1 and flip-flop 142N at stage N. Interconnection and details of flip-flop circuits arranged to form a shift register is known so it need not be described further. The Q output terminal of each flip-flop circuit is connected to a select input (e.g. 146 in stage N) of a respective one of the switch blocks (e.g. 130N) to provide the corresponding binary select signal. Clock inputs to the flip-flop circuits are coupled to receive the accumulator clock signal.

FIG. 5A is a schematic diagram showing details of an individual switch block 130. The switch block includes Q replications of a circuit that comprises a multiplexer coupled to a flip-flop circuit. For example, a first multiplexer 131 has an output terminal 132 coupled to the D input terminal of a flip-flop circuit 139.

Each multiplexer has a select input terminal (e.g. 133) for receiving a binary select signal and a mode input terminal (e.g. 134) for receiving a binary mode signal.

The select and mode input signals control the multiplexer to select one of four inputs. The selected input is coupled to the output terminal (e.g. 132) in accordance with the truth table shown in FIG. 5B.

The select input terminals within each switch block are connected together to receive a select signal for controlling all of the multiplexers within the switch block. All of the mode input terminals (e.g. 148 in FIG. 4B) throughout all of the switch blocks are coupled to receive a common mode signal, discussed below. Additionally, the clock input terminals (e.g. 149 in FIG. 4B) to all the flip-flop circuits throughout the switch blocks are coupled to receive a common clock signal. Because the select and mode input signals, and flip-flop clock signals, are common to a given switch block, it is useful to consider all of the multiplexer/flip-flop circuits within one switch block in parallel, as follows.

Each multiplexer has a first input terminal (e.g. 136) for receiving a corresponding phase modulation data bit (labeled NEW D). The first input terminals of all the multiplexers within a given switch block together form the first switch block input port, Q bits wide. Similarly, each multiplexer has a second input terminal (e.g. 138) for receiving a corresponding increment data bit (labeled NEW C). The second input terminals of all the multiplexers within a given switch block together form the second switch block input port, also Q bits wide.

Similarly, the multiplexer output terminals (e.g. 133) within a switch block together form a multiplexer output port. The D inputs to the flip-flop circuits within a switch block together form a data port. The multiplexer output port is coupled to the data port. The Q output terminals of the flip-flop circuits together form a Q output port. The multiplexer output port, data port and Q output port are each Q bits wide.

The flip-flop clock inputs (e.g. 135) are coupled to receive the accumulator clock signal. Each flip-flop Q output terminal is coupled along a feedback path (e.g. 137) to a third input terminal of the corresponding multiplexer. In other words, the Q output port is coupled to a third multiplexer input port.

Referring again to FIG. 4, shift register 140 is coupled to the series of switch blocks 130 through 130N to provide a series of N binary select signals. Specifically, each shift register Q output terminal (e.g. node 147 in stage N−1) is connected to a respective one of the switch blocks to provide the corresponding select signal.

All bits of the shift register can be cleared to control the switch blocks accordingly. When all the multiplexer select signals are set to 0, the multiplexers source either Q Previous from the second input port, for constant frequency operation, or NEW C from the first input port to change to a new increment, as indicated in the truth table of FIG. 5B.

OPERATION OF THE NEW ARCHITECTURE

Referring to FIG. 5B, each switch block multiplexer (and ergo the switch block) can source a selected one of three inputs—Q previous, NEW C and NEW D. For steady-state operation (i.e. fixed frequency and phase), the mode signal is low (0) and the select signals are all low (0), so each multiplexer sources the previously stored Q output. See the first row of the truth table. The accumulator simply increments by the previously stored increment value responsive to each clock cycle. For the select signals to be low, the shift register is cleared.

To change increment value, the mode signal remains low, and the select signals must be sequentially asserted (high), so that each of the switch blocks successively switches to sourcing the NEW C at the appropriate time, in ascending order of binary significance. See the second row of the truth table of FIG. 5B. To do so, a one bit (logic high) is input to the least significant stage (lsb) of the shift register (node 141). On the next clock cycle, the lsb Q output terminal provides a one (logic high) as the select signal to be asserted to switch the multiplexer to sourcing a NEW C value. This is done sequentially through the switch blocks, as described above, to change to the NEW C increment value.

The Mode signal is asserted high (1) for phase modulation operation, as follows. While the select signal is low, each multiplexer sources NEW C, a predetermined increment value. When the select signal goes high, the selected multiplexer sources NEW D, a phase modulation increment value. Each switch block is selected sequentially, to coherently enter the phase modulation increment, while the nonselected switch blocks continue to source NEW C. In other words, the nonselected switch blocks switch back to sourcing the NEW C value after the shift register pulse passes. The values of NEW C, NEW D, and Repeat Value can be changed to produce the normal ranges of DDS frequency and phase modulation typical of traditional systems.

FIGS. 6–9 are CAD diagrams illustrating one example of an operative circuit that embodies the invention, designed for implementation in a production gallium arsenide digital integrated circuit. The example employs a 24-bit accumulator, partitioned into 12 stages. The circuitry includes provision for 12-bit phase modulation.

Referring to FIG. 6, the accumulator includes a block 122, representing the least significant stage. Block 122 receives inputs A(0) A(1) and appropriate clock signals, and provides output data signals AC_Q(0) and AC_Q(1) and a carry output CO(1) for input to the next stage. Window 160 represents the next 10 more significant stages of the accumulator. Finally, block 124 represents the most significant stage of the accumulator. Block 124 receives input signals A(22) and A(23) and a carry input signal CO(11) from window 160, and provides data output signals AC_Q(22) and AC_Q(23). Accumulator clock signals are provided by circuitry represented by blocks 165 and 166. The accumulator clock signal circuitry is conventional and therefore not described further.

A loadable down counter and related circuitry are represented by block 162. The down counter receives an externally-provided input signal, designated LP_CNT(6:0), and provides a terminal count signal TC as one of its output signals. Additional detail of the counter is discussed below with regard to FIG. 7.

Input delay equalization circuitry is represented by block 164. Block 164 receives the NEW C word, here designated PHS_C(23:0), where 23:0 represents a series of 24 bit numbers, as is conventional. Block 164 also receives the NEW D word, designated PHS_D(23:12). Only 12 bits of phase modulation data are used in this example, as 12 bits is deemed adequate phase modulation resolution for many applications. These bits correspond to the most significant 12 bits of the accumulator. Thus, the smallest phase jump, where PHS_D(23:12)=000 ... 1, results in a jump of one part in 4024 in the accumulator.

The input block 164 also receives the mode signal, designated PM(23:12). Only 12 bits are required, as only the switch blocks that implement the NEW D data (12 bits) require the mode signal, as further explained below. The input block 164 also receives 36 clock signals CKARG(36:0), further discussed below. The input circuitry block 140 provides coherent input data A(23:0) to the accumulator. Details of block 164 are discussed below with regard to FIG. 8. Block 150 provides reset signals RAC(34:0) for resetting the accumulator.

The accumulator output signals AC_Q(21:12) are provided to conventional output delay equalization circuitry, represented by block 170, similar to that described in the background of the invention section above. Only the high order bits used to form a memory address need be equalized. The equalization block 170 provides coherent output data signals ACC(11:0) which can be used, for example, to address a RAM. Window 176 represents 12 replications of a buffer 178 for buffering the output data signals ACC(I) to form address data signals RAM_AD(I), for I=0 to 11.

Figure 7A:
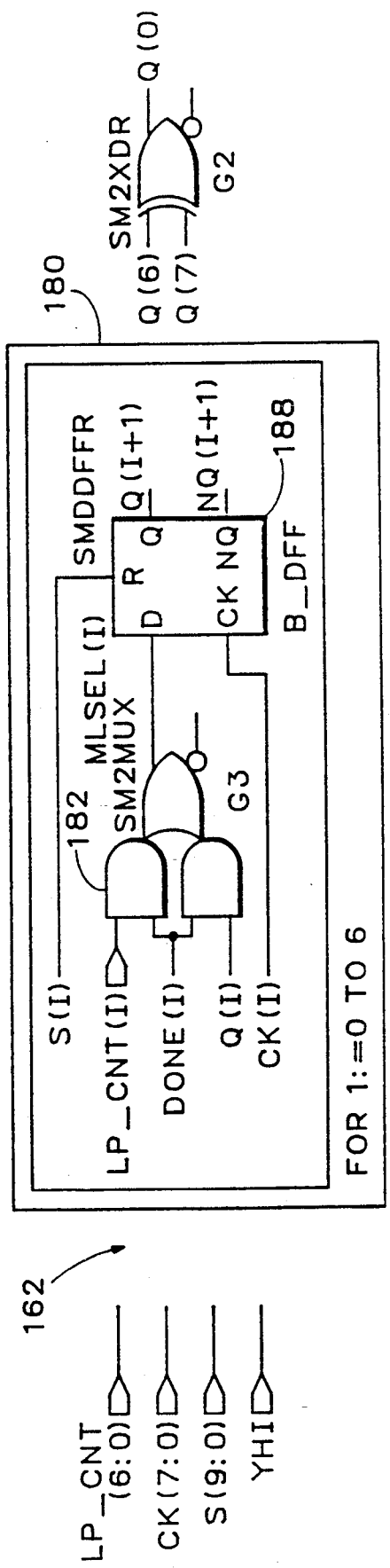
FIG. 7 is a detailed CAD diagram showing details of the loadable down counter circuitry 162 of FIG. 6.
Figure 7B:
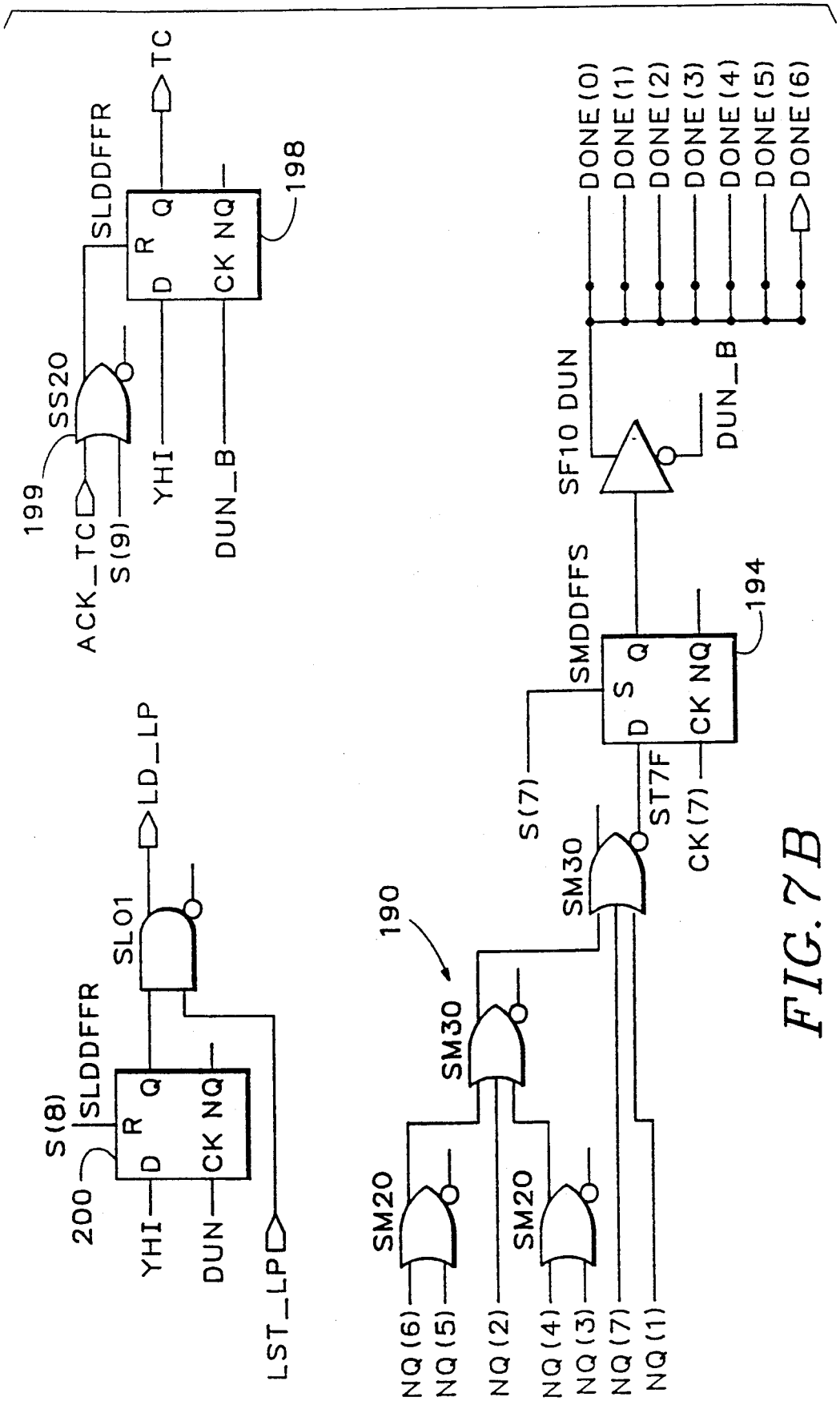

Referring now to FIG. 7, block 162 includes a loadable down counter, here represented by a window 180, and related circuitry. Window 180 represents seven replications of the circuitry shown within the window, for I=0 to 6, each replication forming one stage of the counter. The window circuitry includes input gating 182 coupled to a D-type flip-flop circuit 188.

The input gating 182 of each stage receives a respective bit of the initial count LP_CNT(I), a data bit Q(I) from the next least significant stage, and a done signal DONE(I) indicating that the counter reached the final state. The done signal high state gates the initial count bit to the flip-flop D input for loading the counter, whereas DONE low gates the Q(I) data bit to the flip-flop to continue counting.

An array of OR logic gates 190 provides a one (high) input to a flip-flop circuit 194 only when all of counter output signals NQ(1:7) are low, indicating that the counter has reached a terminal count. A Q output terminal of flip-flop 194 is buffered to provide the input signals DONE(0:6) to the counter 180, and to provide a DUN_B signal.

The DUN_B signal clocks a one into a flip-flop circuit 198. A Q output terminal of flip-flop 198 provides the terminal count signal TC to the host processor. Flip-flop 198 also has reset input gating 199 arranged for handshaking with the processor (ACK_TC). Another flip-flop circuit 200 receives the done signal (DUN), and responsive thereto clocks a logic one (YHI) to its Q output terminal. The logic one is gated to provide a signal LD_LP for initializing the shift register, described next.

Figure 8A:
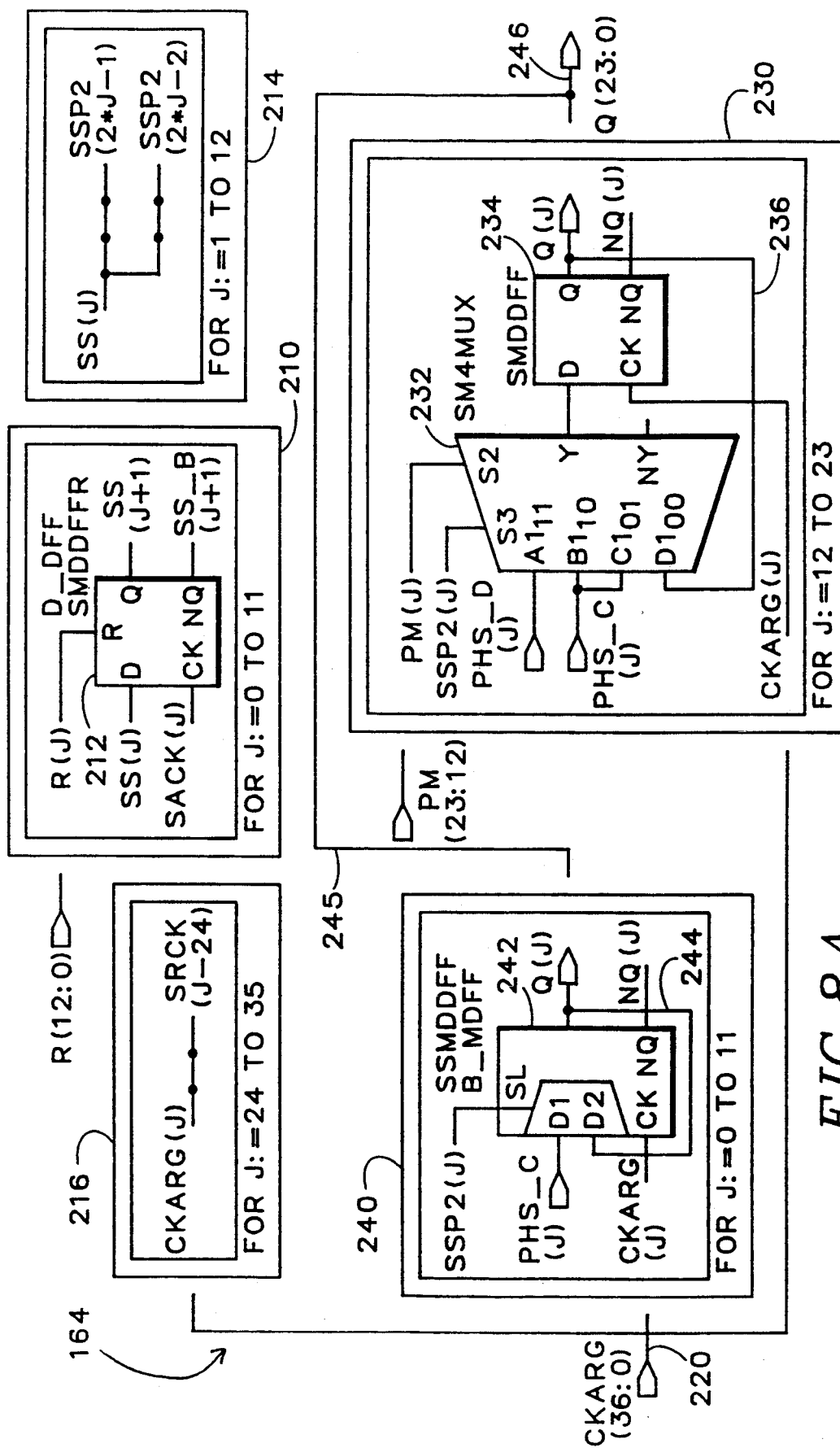
FIG. 8 is a detailed CAD diagram showing details of the input delay circuitry 164 of FIG. 6.
Figure 8B:
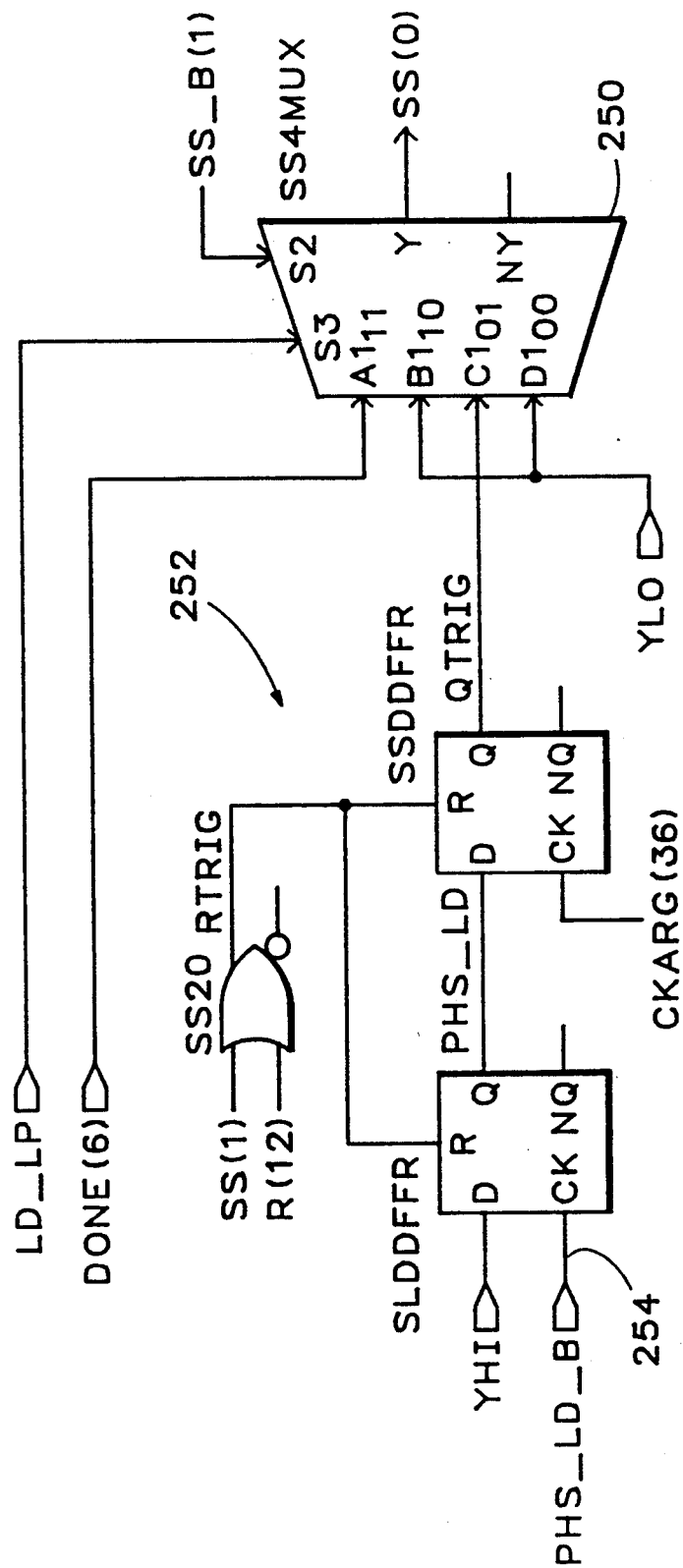

Referring to FIG. 8, a 12-bit shift register is represented by a window 210. The window represents 12 replications of the circuitry within the window, here a flip-flop circuit 212. Each flip-flop Q output terminal is connected to the next stage D input terminal (SS(J)), so that the flip-flops together form a shift register.

Window 214 is simply a "translator," i.e. a CAD software construct that translates signals designated SS(J) (the shift register output signals) to the designation SSP2(2*J−1), for J=1 to 12. These become the switch block multiplexer select signals, discussed below. Similarly, window 216 translates clock signals designated CKARG(J) to the designation SRCK(J-24), for J=24 to 35. The high order CKARG clock signals (input at node 220) thus become shift register clock signals SRCK(J) to clock flip-flops 212.

Window 230 represents circuitry to provide the phase modulation switch block functions. In particular, window 230 represents 12 replications (for J=12 to 23) of the circuitry shown, to provide 12-bit phase modulation. The window circuit includes a 4:1 multiplexer circuit 232 having its output terminal (Y) coupled to the D input of a flip-flop circuit 234. Each multiplexer 232 input receives a respective bit of the NEW D word PHS_D(J), a respective bit of the NEW C word PHS_C(J) (coupled to two inputs), and the previous Q output bit, provided along a feedback path 236. The multiplexer is controlled by a mode signal PM(J), provided by the host processor, and a select signal SSP2(J) (the shift register output signals).

Window 240 represents switch block circuitry for the low order bits, i.e. for J=0 to 11. Because phase modulation does not affect the low order bits in this example, simpler switch block circuitry, comprising a flip-flop circuit 242 having a 2:1 multiplexer input stage is adequate. These switch blocks need only select bits from the NEW C word PHS_C(J) or the Q previous bit, provided along a feedback path 244. The multiplexer input stage to flip-flop 242 accordingly is controlled by a select bit SSP2(J), and no mode bit is required. The select shift register (window 210), phase modulation switch blocks (window 230) and simplified switch blocks (window 240) are all driven by clock signal CKARG(36:0) so they operate synchronously. Window 240 provides output bits Q(0:11) over path 245, which concatenate with output signals Q(12:23) from window 230, to form output bits Q(23:0) at node 246 for input to the accumulator.

A 4:1 multiplexer 250 provides an initial bit SS(0) for loading the least significant stage of the shift register. The multiplexer 250 is controlled by a load command signal LD_LP and the shift register lsb output SS_B(1), to load a zero into the shift register when the lsb already has a one output signal, and to load a one, and only a single one, into the shift register when the down counter signals a terminal count (DONE(6) is high) and the load command signal is asserted. Thus, this load command enables repetitive phase modulation mode. The additional circuitry 252 provides for reset, clock synchronization, and the like as will be familiar to those skilled in the art.

Figure 9:
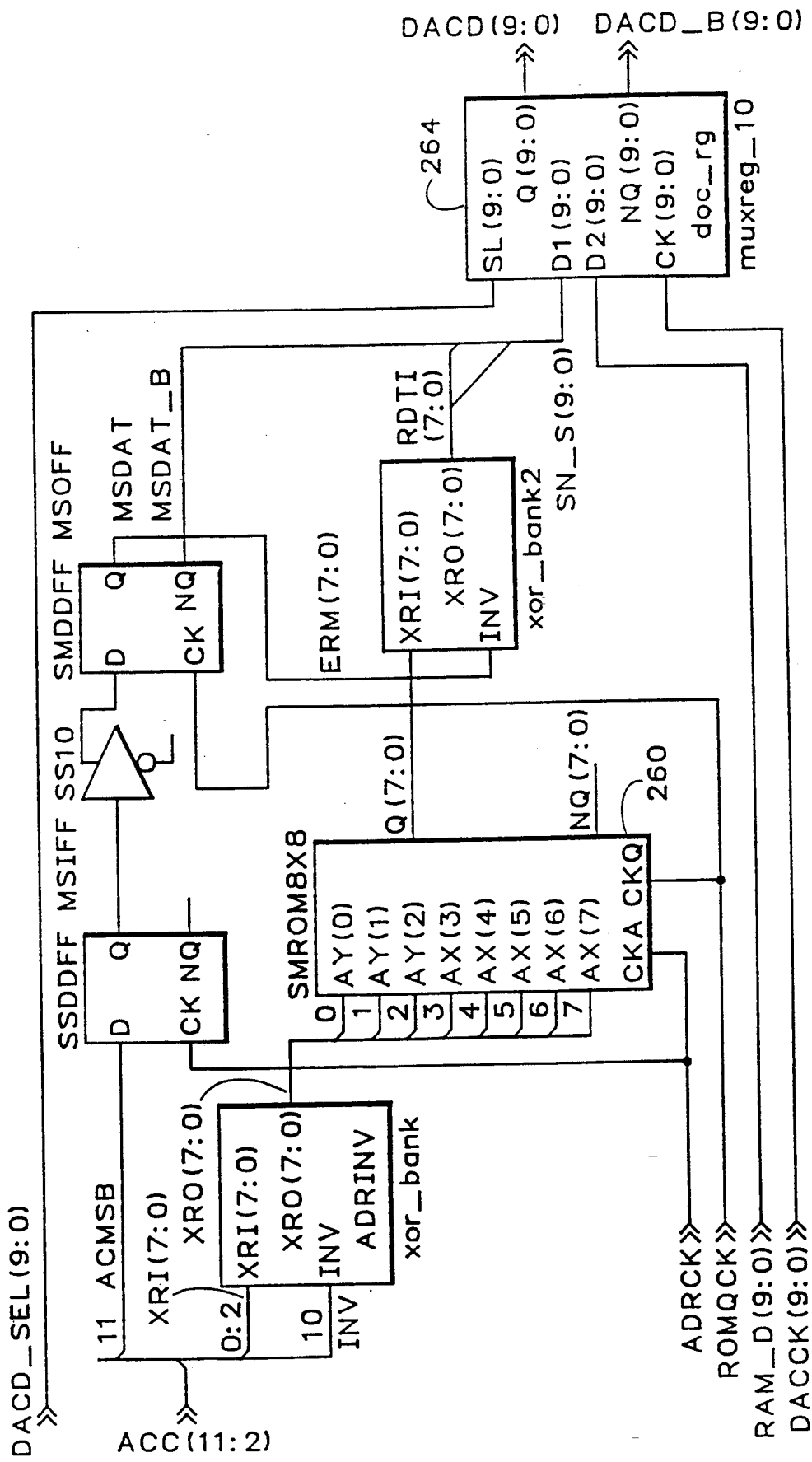
FIG. 9 is a higher-level CAD diagram of read-only memory (ROM) and output circuitry of the DDS integrated circuit design of FIG. 6.

Referring now to FIG. 9, the example of an operative integrated circuit design shown in part in FIG. 6 further includes an on-board ROM 260, for lookup of a predetermined waveform. An output multiplexer/register array 264 provides for selecting either ROM output data, or address data for addressing an external RAM. Additional detail of the output circuitry is not material here and, in any event, will be apparent to those skilled in the art.

Figure 10:
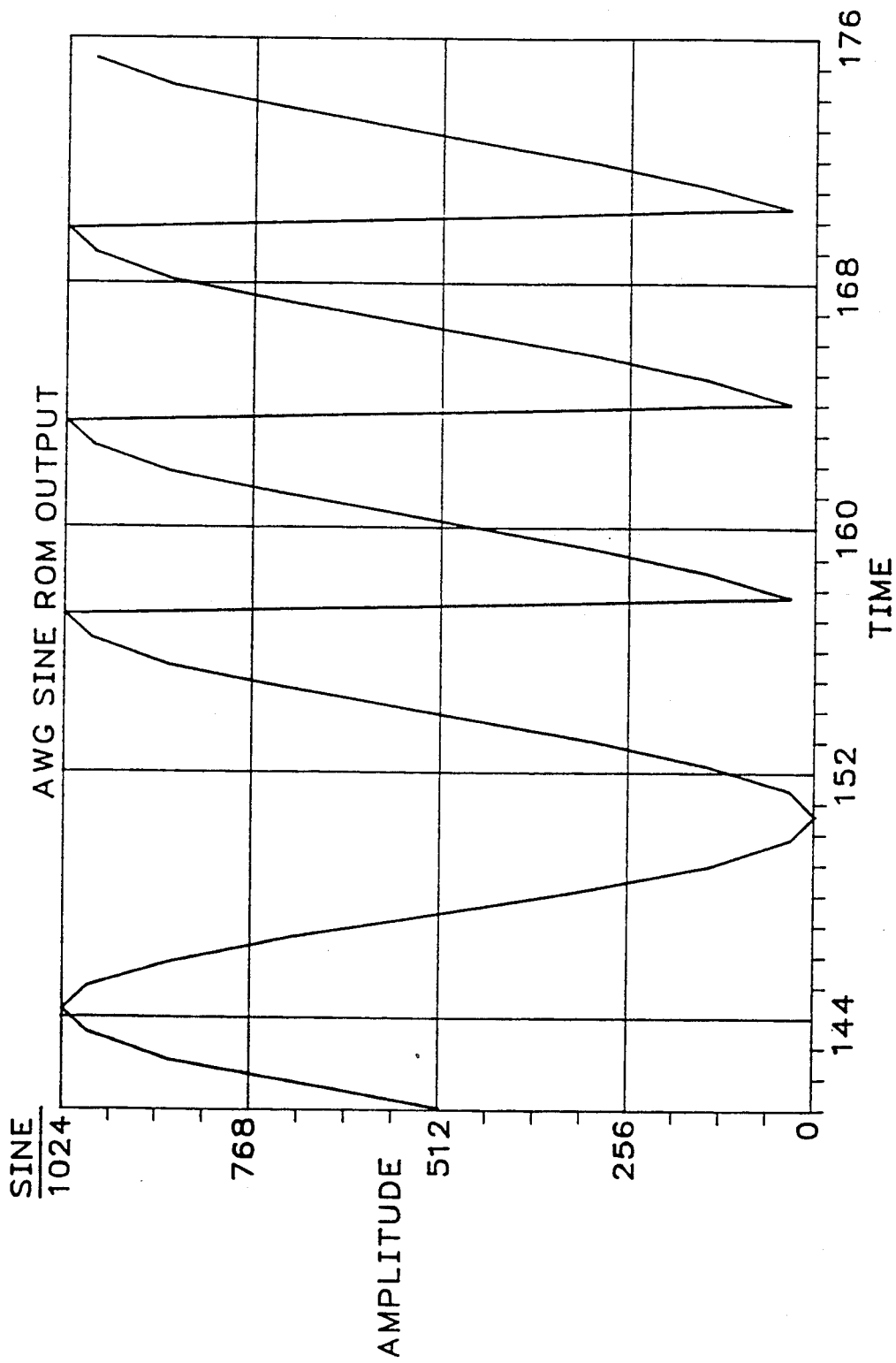
FIG. 10 is a simulation plot of a waveform generated by the integrated circuit design of FIGS. 6-9, showing normal operation during a first cycle of the waveform and phase modulated operation during subsequent cycles.

FIG. 10 is a simulation plot of amplitude versus time, depicting a waveform generated by simulating operation of the design of FIGS. 6–9. The plot shows a single full cycle of a sine waveform, followed by repetitive phase modulation of 180 degrees. For the simulation, NEW C=100,000 and NEW D=400. The down counter load value is 55.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

We claim:

1. Input delay equalization circuitry for use with a pipelined accumulator having N stages of Q bits per stage where N and Q are integers greater than 1, and driven by an accumulator clock signal, the circuitry comprising:

first input means for receiving a first binary word representing a predetermined new increment value for input to the accumulator, the first binary word consisting of a first ordered series of N groups of bits, each group having Q bits;

a series of N switch blocks, each switch block corresponding to a respective stage of the accumulator and including:

multiplexer means having a first multiplexer input port, coupled to the first input means to receive a respective one of the first-series groups of bits, a second multiplexer input port and a multiplexer output port for coupling a selected one of the first and second multiplexer input ports to the multiplexer output port responsive to a state of a binary multiplexer select signal;

storage means having a data port, a Q output port and a clock input terminal coupled to receive the accumulator clock signal, for storing data present at the data port responsive to the accumulator clock signal and for providing the stored data at the Q output port, the data port being coupled to the multiplexer output port to receive selected data and the Q output port being coupled to the second multiplexer input port for recirculating stored data; and means for coupling each one of the storage means Q output ports to the corresponding stage of the accumulator to provide increment data;

select means coupled to the series of switch blocks for providing a series of N binary select signals, each one of the series of binary select signals being coupled to a respective one of the multiplexer means as the corresponding multiplexer select signal;

the select means including means for setting all of the multiplexer select signals to a predetermined binary state to couple the second multiplexer input ports to the corresponding multiplexer output ports; and the select means further including means for sequentially changing the binary state of each one of the series of select signals responsive to the accumulator clock signal to sequentially couple each first multiplexer input port to the corresponding multiplexer output port in each successive one of the series of switch blocks, thereby sequentially coupling the first-series groups to the accumulator.

2. Input delay equalization circuitry according to claim 1 further comprising:

second input means for receiving a predetermined second binary word representing a phase modulation increment value for input to the accumulator, the second binary word consisting of a second ordered series of N groups of bits, each second-series group having Q bits; and third input means for receiving a binary mode signal; and wherein:

each multiplexer means includes a third multiplexer input port coupled to the second input means to receive a respective one of the second-series groups; and each multiplexer is responsive to the states of the mode signal and the corresponding multiplexer select signal to couple a selected one of the first, second and third multiplexer input ports to the corresponding multiplexer output port, for providing one of the new increment value, the previously stored increment value, and the phase modulation increment value, respectively, to the accumulator.

3. Input delay equalization circuitry according to claim 2 wherein the select means includes a shift register having N storage elements, each storage element including a clock input terminal coupled to receive the accumulator clock signal and an output terminal to provide a corresponding one of the binary select signals.

4. Input delay equalization circuitry according to claim 2 wherein:

each multiplexer means includes Q multiplexers, each multiplexer having first, second, third and fourth multiplexer input terminals and a multiplexer output terminal, the multiplexers arranged such the first multiplexer input terminals together form the first multiplexer input port, the second multiplexer input terminals together form the second multiplexer input port, the third multiplexer input terminals together form the third multiplexer input port, and the multiplexer output terminals together form the multiplexer output port;

each multiplexer further having first and second control input terminals, the first control input terminals within each switch block being coupled together to receive the corresponding multiplexer select signal, and all of the second control input terminals being coupled together to receive the mode signal.

5. Input delay equalization circuitry according to claim 4 wherein each storage means includes Q flip-flop circuits, each flip-flop circuit having a data input terminal, a clock input terminal coupled to the switch block clock input terminal, and a Q output terminal, each Q output terminal being coupled along a feedback path to the corresponding multiplexer second input terminal.

6. Input delay equalization circuitry according to claim 2 wherein the second binary word, representing a phase modulation increment value, consists of a third ordered series of M groups of bits, where M is a nonzero integer less than or equal to N;

the multiplexer means in the switch blocks that correspond to the M most significant accumulator stages include the third multiplexer input port; and the multiplexer means in the remaining switch blocks include only the first and second multiplexer input ports.

7. A direct digital synthesis (DDS) system comprising:

an N-stage pipelined accumulator driven by a clock signal for processing increment data;

first input means for receiving a first binary word representing a predetermined increment value, the first binary word consisting of a first ordered series of N groups of bits, each first-series group corresponding to a respective stage of the accumulator;

second input means for receiving a second binary word representing a phase modulation increment value, the second binary word consisting of a second ordered series of M groups of bits, where M is a nonzero integer less than or equal to N, each second-series group corresponding to a respective stage of the accumulator;

a series of M switch blocks, corresponding to the M most significant stages of the accumulator, respectively, each switch block coupled to the first input means to receive a respective one of the first series of groups of bits, coupled to the second input means to receive a respective one of the second series of groups of bits and coupled to the corresponding stage of the accumulator to provide increment data;

each of the M switch blocks including means responsive to a binary select signal for selecting one of the first and second groups of bits as the increment data;

a shift register having at least M stages driven by the clock signal, each one of M contiguous stages of the shift register having a Q output terminal coupled to a respective one of the switch blocks to provide the corresponding binary select signal; and means for loading a single bit into the shift register to provide a pulse so that, as the pulse propagates through the said M stages of the shift register, the select signals control each switch block to provide a second-series groups of bits to the corresponding stage of the accumulator and then switch back to providing the corresponding first-series group of bits after the pulse passes.

8. A DDS system according to claim 7 including a second series of N-M switch blocks, corresponding to the N-M least significant stages of the accumulator, respectively, each second-series switch block coupled to the first input means to receive a respective one of the first series of groups of bits and coupled to the corresponding stage of the accumulator to provide increment data;

each one of the second series switch blocks including means for storing a selected group of bits;

each one of the second series switch means further including means responsive to the binary select signal for selecting one of the first series of groups of bits and a previously stored group of bits as increment data; and wherein the shift register has N stages, each stage having a Q output terminal, the M most significant output terminals being coupled to the first-series switch blocks to provide the corresponding binary select signals and the M-N least significant output terminals being coupled to the second-series switch blocks to provide the corresponding binary select signals.

9. A DDS system according to claim 7 wherein:
each accumulator stage has Q bit positions; and
the selecting means in each switch block includes Q multiplexers, each multiplexer having an output terminal for providing a respective bit of the increment data to the accumulator.

10. A DDS system according to claim 9 wherein:
each switch block further includes Q flip-flop circuits, each flip-flop circuit having a data input terminal coupled to the output terminal of a respective one of the multiplexers to receive a selected bit and having a Q output terminal coupled to a respective bit position in the corresponding stage of the accumulator and coupled along a feedback path to said one of the multiplexers.

11. In a direct digital synthesis (DDS) system having an N-stage pipelined accumulator driven by a clock signal, a method of phase modulation comprising:
providing an increment data word comprising a first ordered series of N groups of bits, each first-series group corresponding to a respective stage of the accumulator;
providing a phase modulation data word comprising a second ordered series of M groups of bits, where M is a nonzero integer less than or equal to N, each second-series group corresponding to a respective stage of the accumulator;
responsive to a first cycle of the clock signal:
selecting a least significant one of the second series of groups;
coupling the selected second-series group to the corresponding stage of the accumulator;
selecting all of the first series of groups except a first-series group that corresponds in binary significance to the selected second-series group; and
coupling the selected first-series groups to the respective corresponding stages of the accumulator; and
responsive to each one of a next M-1 clock cycles:
selecting a next least significant one of the second series of groups;
coupling the selected second-series group to the corresponding stage of the accumulator;
selecting all of the first series of groups except a first-series group that corresponds in binary significance to the selected first-series group; and
coupling the selected first-series groups to the respective corresponding stages of the accumulator; thereby interleaving the phase modulation data word into the increment data provided to the accumulator.

12. A method according to claim !1 including:
providing a predetermined Repeat Value;
counting cycles of the clock signal; and
comparing the number of counted clock cycles to the Repeat Value; and wherein
a next clock cycle after the number of counted clock cycles equals the Repeat Value defines the first clock cycle, to begin interleaving the phase modulation data word after the Repeat Value number of clock cycles.

13. A method according to claim 12 including:
detecting each time the number of clock cycles since the first clock cycle equals the Repeat Value; and
responsive to each said detection, repeating the foregoing steps to interleave the phase modulation data word, thereby operating the accumulator in a repetitive phase modulation mode.

14. In a direct digital synthesis (DDS) system having a pipelined accumulator driven by a clock signal, the accumulator having N stages of Q bits per stage, a method of changing increment value comprising:
(a) providing N storage elements of Q bit positions per storage element for storing increment data;
(b) coupling each storage element to a respective one of the accumulator stages to provide stored increment data to the accumulator;
(c) providing a new increment data word, the data word comprising an ordered series of N groups of Q bits per group, each group corresponding to a respective one of the storage elements and to a respective stage of the accumulator;

(d) responsive to a first cycle of the clock signal:
   selecting a least significant one of the series of groups;
   storing the selected group in the corresponding storage element; and
   recirculating data previously stored in the other storage elements; and
(e) responsive to each one of a next N-1 clock cycles:
   selecting a next least significant one of the series of groups;
   storing the selected group in the corresponding storage element; and
   recirculating data previously stored in the other storage elements, thereby sequentially changing each group of stored increment data to reflect the new increment data.

* * * * *

UNITED STATES PATENT AND TRADEMARK OFFICE
CERTIFICATE OF CORRECTION

Figure 6A:
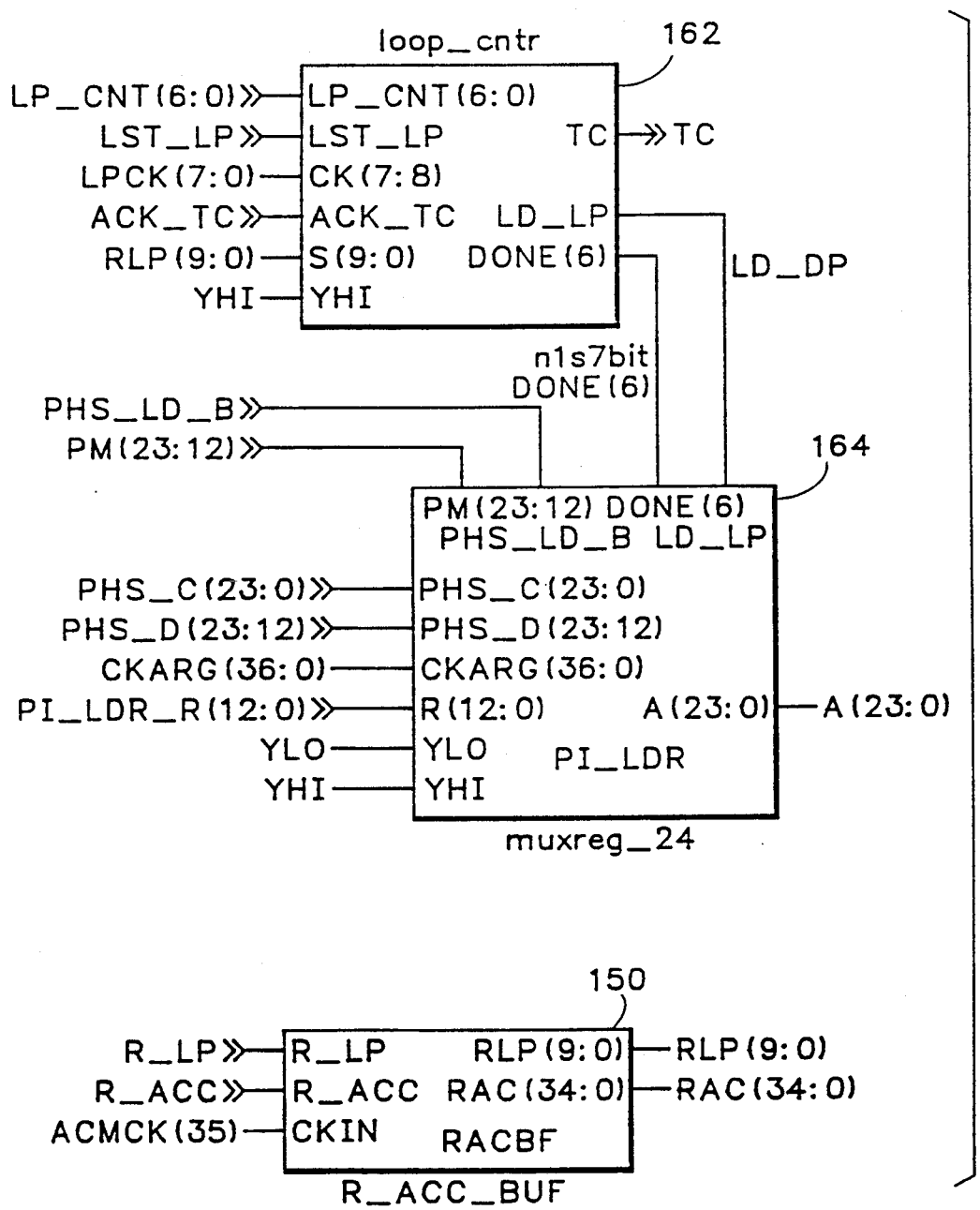
FIG. 6A shows a loadable down counter, input delay equalization circuitry and circuitry for providing reset signals to an accumulator.
Figure 6B:
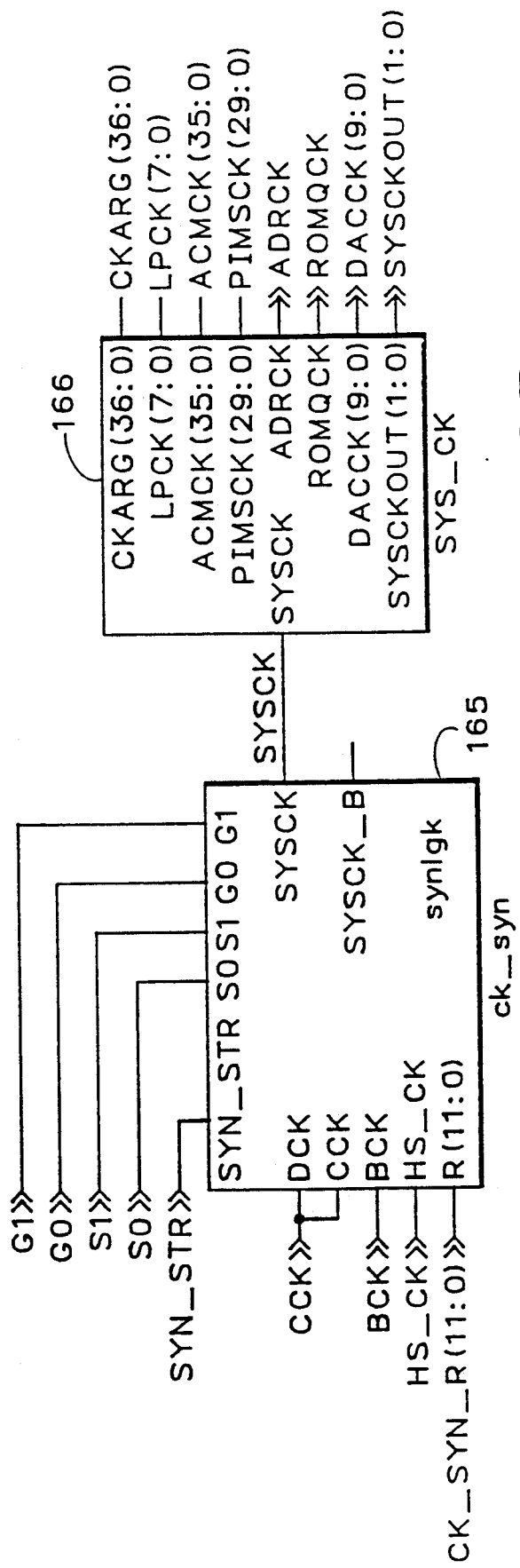
FIG. 6B shows the circuitry for providing accumulator clock signals.
Figure 6C:
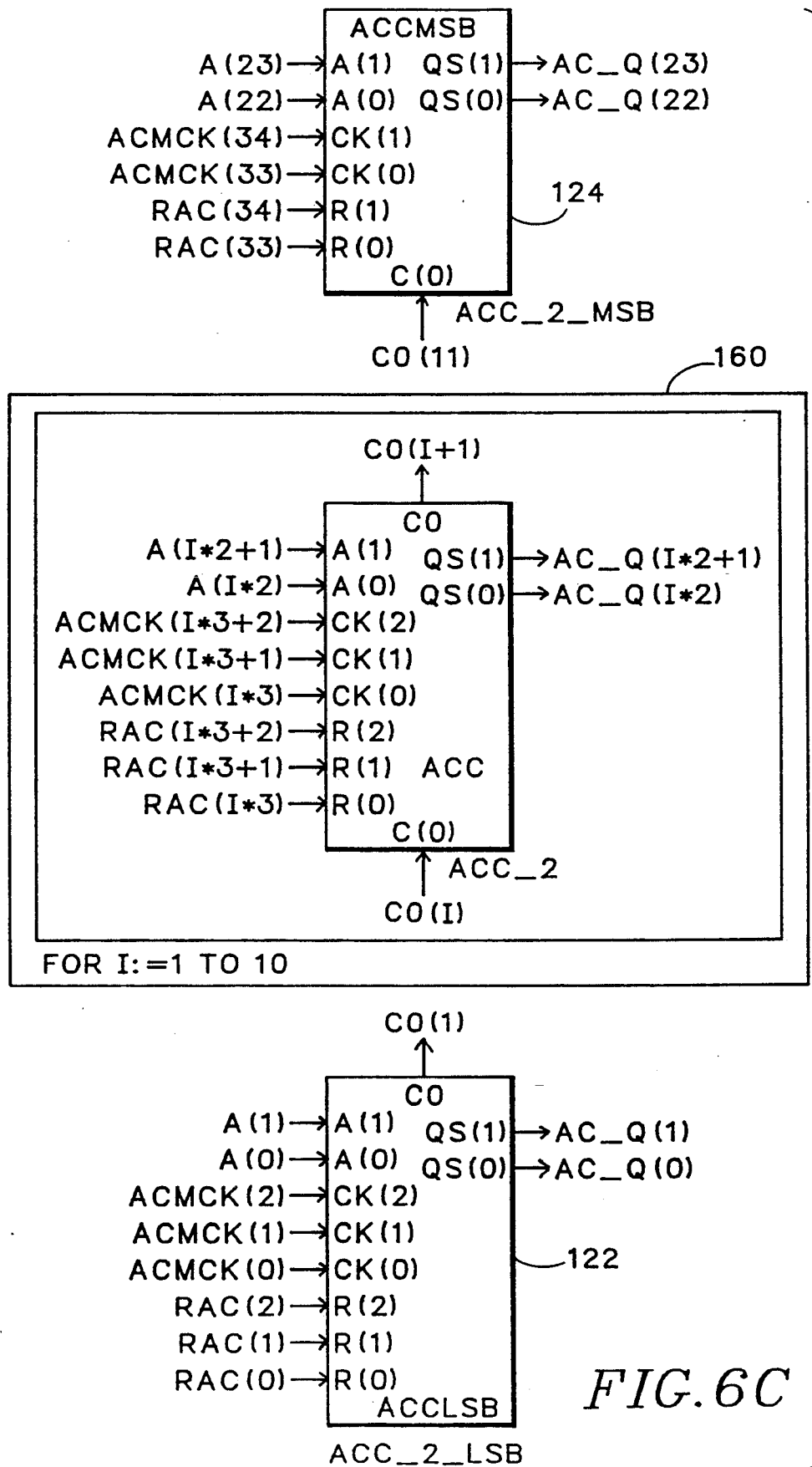
FIG. 6C shows circuitry for providing coherent input to an accumulator, output delay equalization circuitry, and circuitry for buffering output data signals.
Figure 6D:
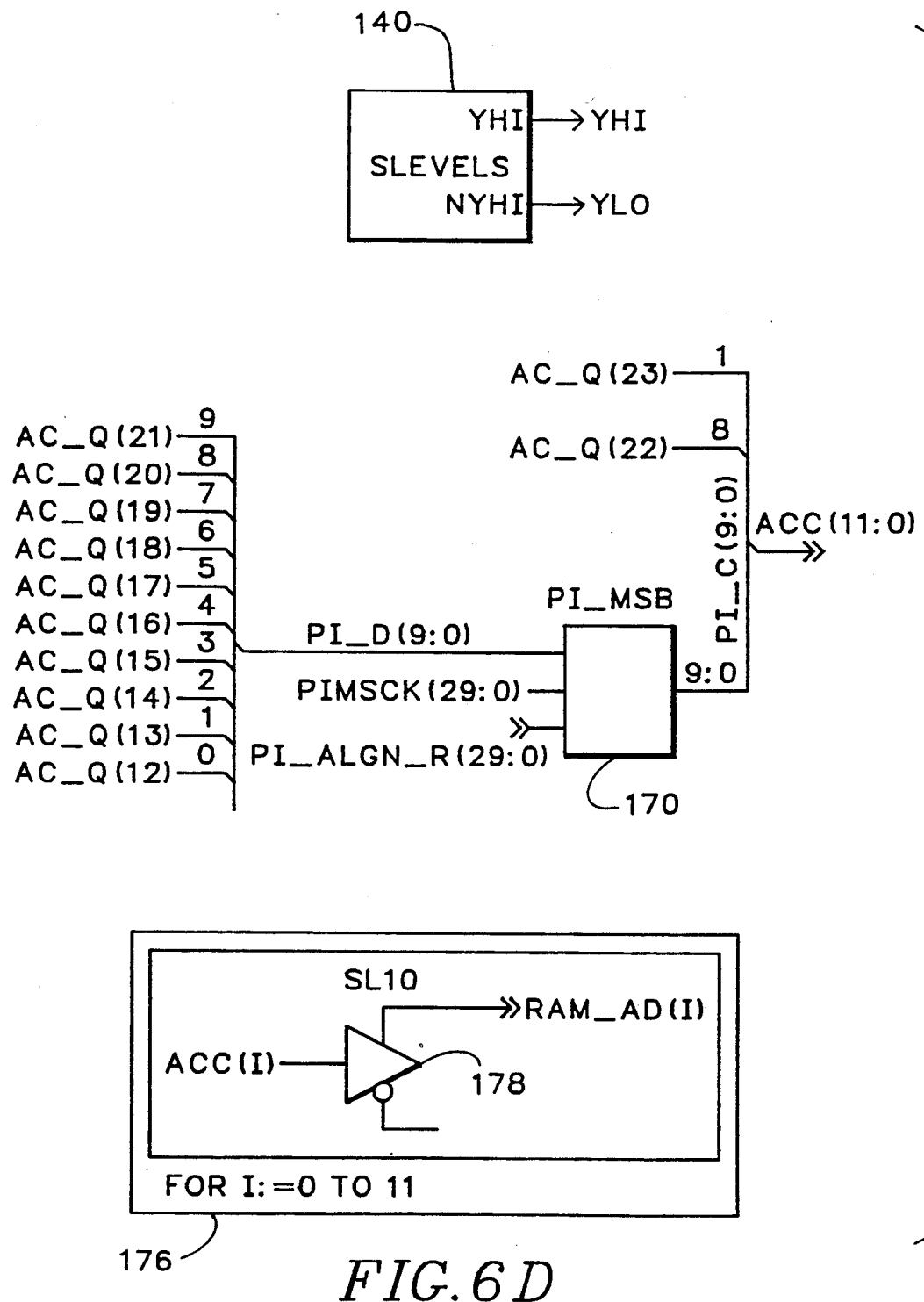
FIG. 6 is a high-level CAD diagram showing selected portions of an example of a DDS integrated circuit design that embodies the present invention.

PATENT NO.    :  5,140,540
DATED         :  August 18, 1992
INVENTOR(S)   :  Bruce W. Cheney, Donald C. Larson, and Arnold M. Frisch It is certified that error appears in the above-identified patent and that said Letters Patent is hereby corrected as shown below:

Column 3, line 46, after "signals." insert --Fig. 6C shows the twelve stages of an accumulator.--

Column 3, line 47, delete "6C" and insert --6D--.

Column 6, line 61, delete "!30" and insert --130--.

Column 14, line 38 delete "!1" and insert --11--.

Signed and Sealed this

Twenty-sixth Day of October, 1993

Attest:

BRUCE LEHMAN

Attesting Officer

Commissioner of Patents and Trademarks